United States Patent [19]
Smit

[11] Patent Number: 5,740,930
[45] Date of Patent: Apr. 21, 1998

[54] CONNECTING MECHANISM FOR CONNECTING A MOBILE UNIT TO A BASIC UNIT

[75] Inventor: Hendrik Smit, Grubbenvorst, Netherlands

[73] Assignee: Océ-Nederland B.V., Netherlands

[21] Appl. No.: 670,427

[22] Filed: Jun. 26, 1996

[30] Foreign Application Priority Data

Jun. 26, 1995 [NL] Netherlands .................. 1000660

[51] Int. Cl.$^6$ .................................................. B60D 7/00
[52] U.S. Cl. ............. 213/75 R; 213/175; 180/14.1; 312/111; 280/461.1; 280/478.1
[58] Field of Search ................ 213/75 R, 175; 180/14.1, 11; 312/107.5, 111; 280/461.1, 47.34, 47.35, 478.1

[56] References Cited

U.S. PATENT DOCUMENTS

| | | | |
|---|---|---|---|
| 1,122,734 | 12/1914 | Grabany | 213/175 |
| 1,897,362 | 2/1933 | Daniels | 213/175 |
| 2,466,860 | 4/1949 | Paig et al. | 213/175 |
| 2,602,553 | 7/1952 | Flowers | 213/75 R |
| 3,207,253 | 9/1965 | Branning et al. | |
| 3,446,365 | 5/1969 | Wriedt | 213/175 |
| 3,756,161 | 9/1973 | Loosli | 213/75 R |
| 4,262,920 | 4/1981 | Mettetal | 280/461.1 |
| 4,433,881 | 2/1984 | Witten et al. | |
| 5,197,392 | 3/1993 | Jeunehomme | 213/75 R |

FOREIGN PATENT DOCUMENTS

| | | |
|---|---|---|
| 2030524 | 12/1971 | Germany . |
| 8704682 | 7/1987 | Germany . |
| 9403468 | 3/1994 | Germany . |
| 2189198 | 10/1987 | United Kingdom . |
| 2215679 | 9/1989 | United Kingdom . |

*Primary Examiner*—Mark T. Le

[57] ABSTRACT

A connecting mechanism for connecting a functional part of a mobile unit to a basic unit. The mobile unit consists of a mobile bottom part provided with compression springs on which the functional part rests. The functional part is provided with connecting elements which can cooperate with connecting elements on the basic unit with the compression springs compressed. The connecting elements are formed by a hook and a roller which form an arcuate contact interface at a lower portion of the units, and by confronting vertical contact surfaces at the top of the units.

25 Claims, 10 Drawing Sheets

CONNECTING MECHANISM FOR CONNECTING A MOBILE UNIT TO A BASIC UNIT

BACKGROUND OF THE INVENTION

1. Field of the Invention

The invention relates to a connecting mechanism for connecting a functional part of a mobile unit to a basic unit. More specifically, to a connecting mechanism having at least one first set of connecting elements formed by a first connecting element connected to the basic unit and a second connecting element connected to the functional part of the mobile unit. The second connecting element can co-operate with the first connecting element in order to functionally connect the units in a required position.

2. Description of Background Art

A connecting mechanism is disclosed in U.S. Pat. No. 4,433,881, which describes a mechanism for connecting mobile units wherein the connecting elements are formed by docking pins on one unit and docking channels on the other unit. To maneuver each docking pin in an associated docking channel when positioning a mobile unit with respect to a fixed unit, the mobile unit disclosed in U.S. Pat. No. 4,433,881 must be lifted at its side situated opposite the fixed unit. This requires considerable effort, particularly if the units for connection are heavy. In addition, if the person making the connection is standing on the side of the mobile unit opposite the side for connection, which is the easiest for the connection, then it is difficult for the person to make the connection, which is then not readily visible.

OBJECTS AND SUMMARY OF THE INVENTION

The object of the invention is to provide a connecting mechanism of the type referred to hereinabove without these disadvantages. To this end, according to the invention, the mobile unit comprises a mobile bottom part and thereabove a functional part which rests resiliently on the bottom part by means of at least one resilient element between said parts. Consequently, irrespective of the position of the mobile bottom part, when it is resting on a floor having a normal unevenness, the functional part can be positioned appropriately with respect to the basic unit even if the basic unit rests on a floor of normal unevenness.

If the resilient element presses the second connecting element on the mobile unit against the first connecting element on the basic unit during the connection of the functional part of the mobile unit and the basic unit, the connection is achieved by holding the mobile unit pressed down against the spring action during engagement and releasing of this unit when it abuts the basic unit, in which connected condition the mobile unit continues to rest on the floor so that there is no risk of the connected units tipping.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
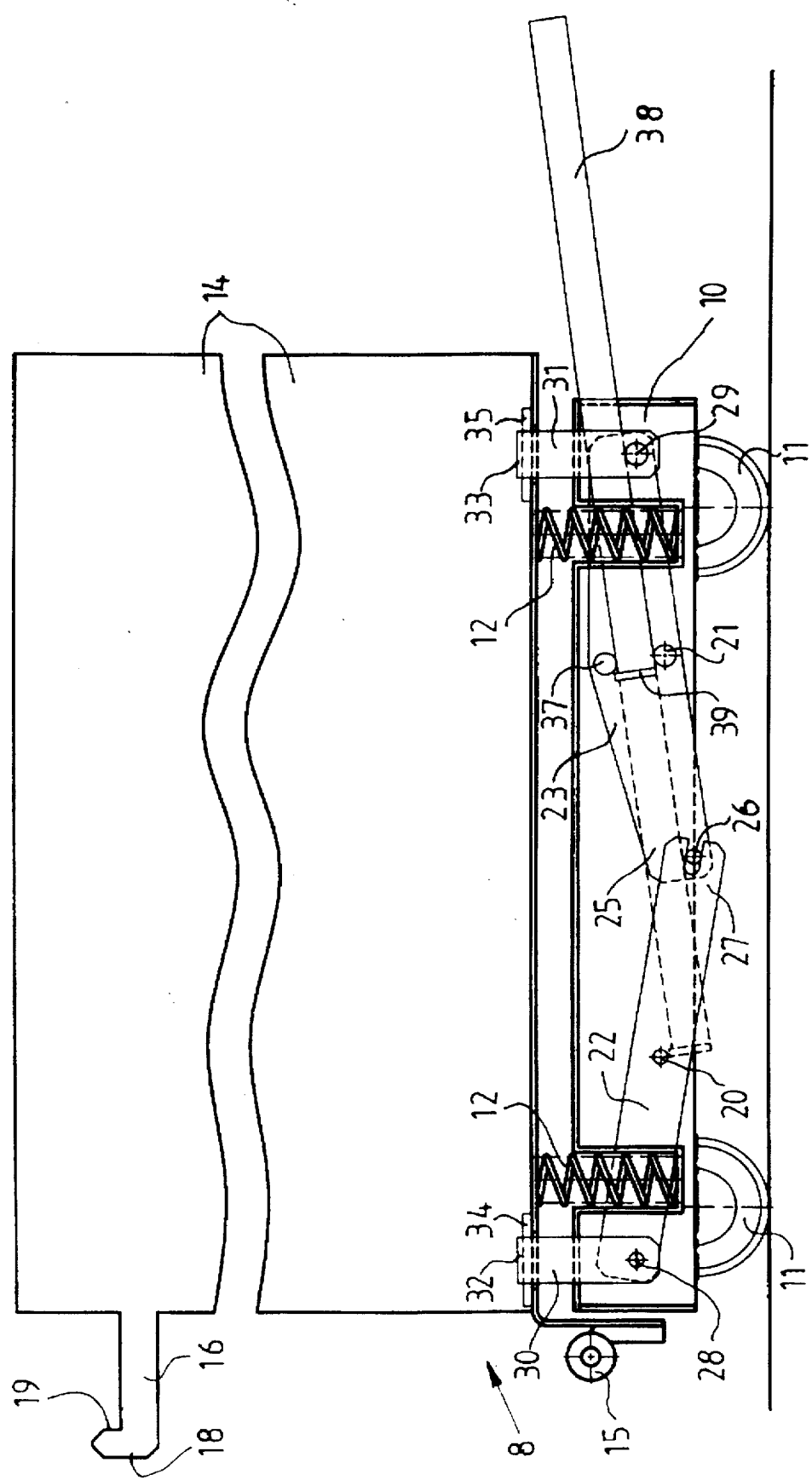
FIG. 1 shows a first embodiment of the mobile unit in the free-standing state.
Figure 2:
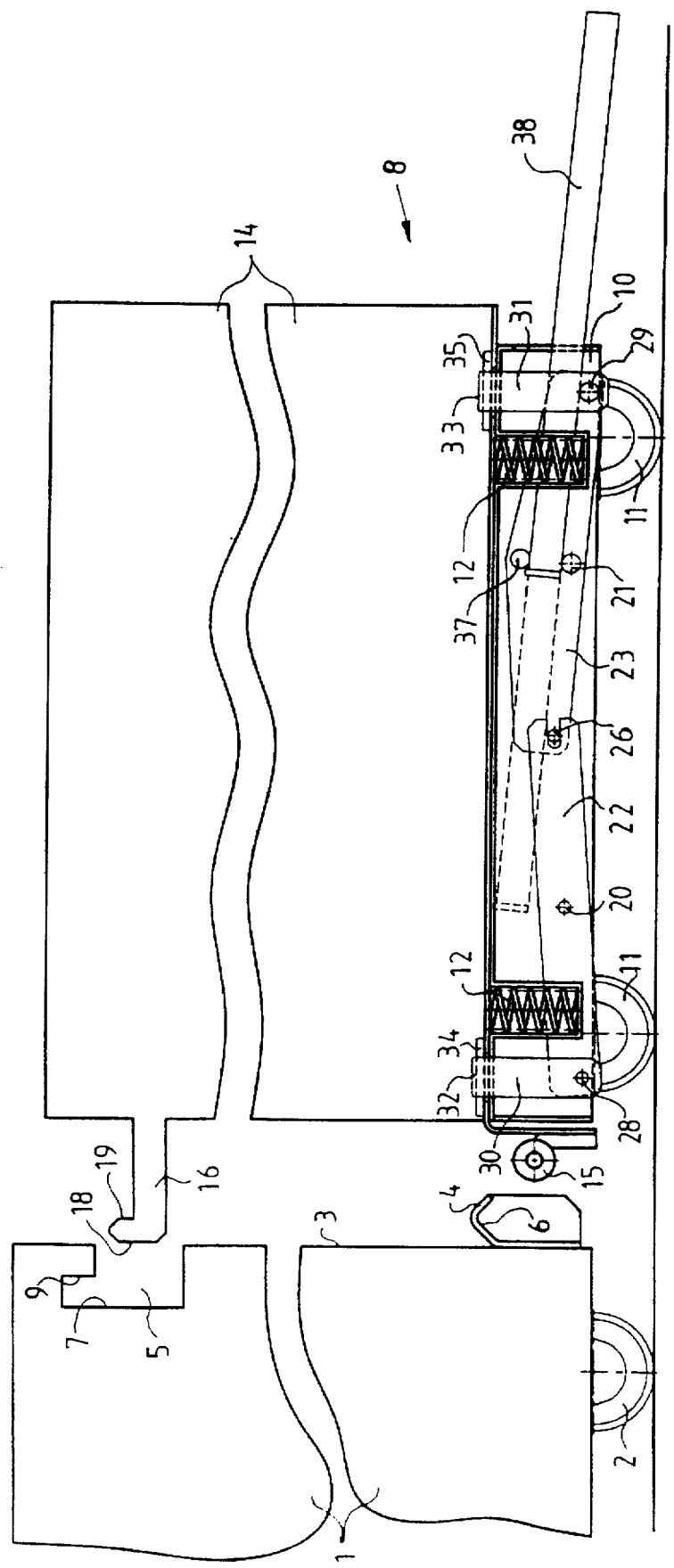
FIG. 2 is a first embodiment of the basic unit and mobile unit according to FIG. 1 in the disconnected state.
Figure 3:
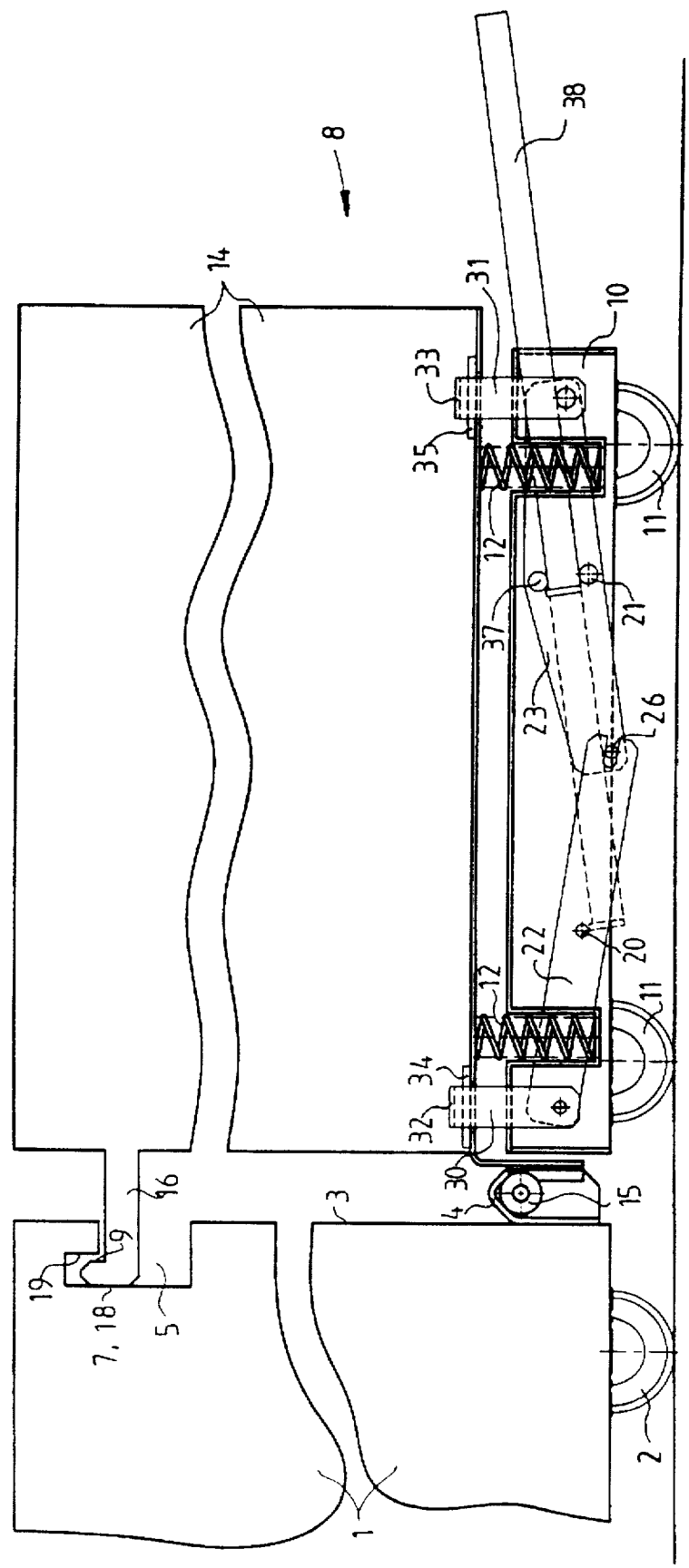
FIG. 3 shows the basic unit and mobile unit according to FIG. 2 in the connected state on a flat floor.
Figure 4:
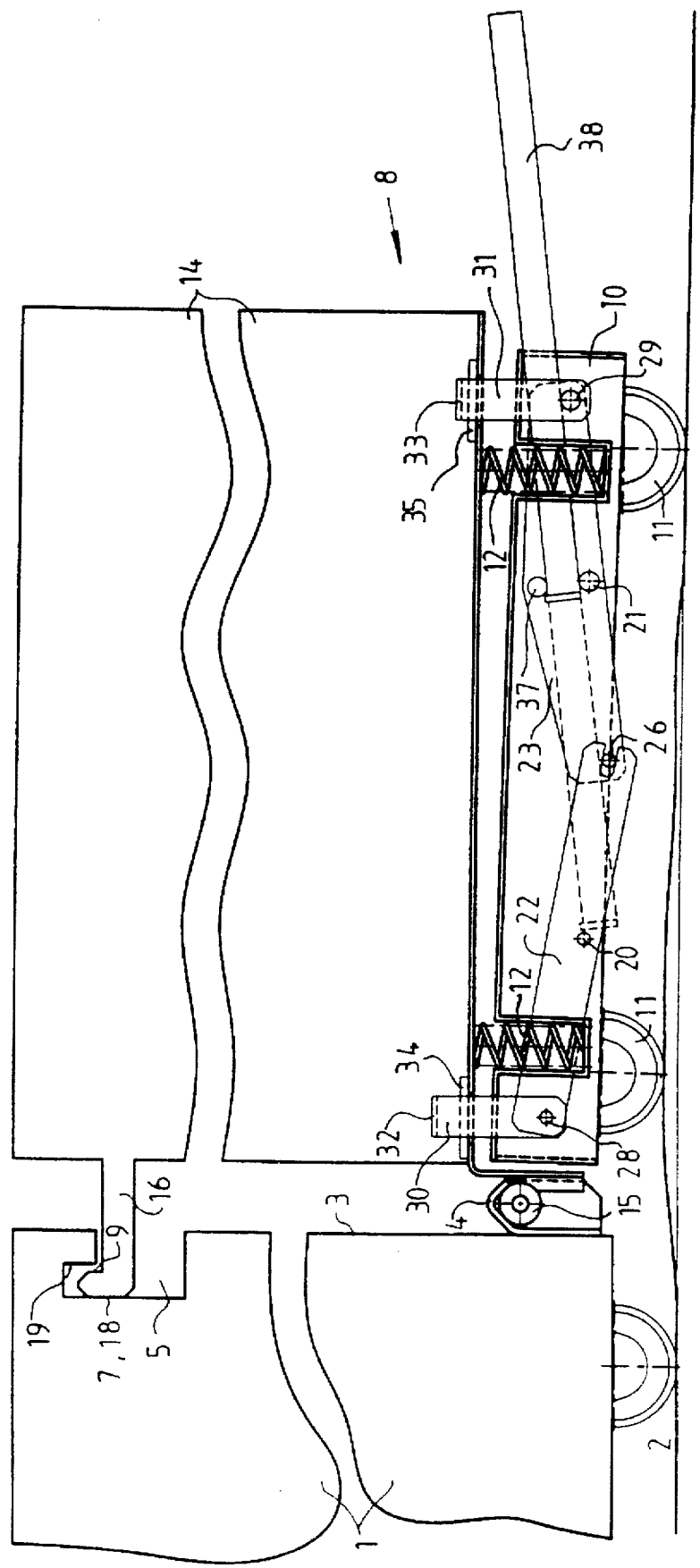
FIG. 4 shows the basic unit and mobile unit according to FIG. 2 in the connected state on a floor which is not flat.

The embodiment of a mechanism according to the invention shown in FIGS. 1 to 4 comprises a basic unit 1 shown in FIGS. 2 to 4, which can be placed in a fixed position, e.g. by locking the wheels 2 on which the basic unit 1 rests. A connecting element in the form of a hook 4 is secured to a side wall 3 of the basic unit 1 near each bottom corner and a hook-shaped recess 5 is formed in the middle of the top. Hook 4 has a downwardly directed concave contact surface 6 and recess 5 has a contact surface 7 extending towards the basic unit. The basic unit can be brought into contact with a mobile unit 8 for coupling to the basic unit by means of these contact surfaces 6 and 7 on the basic unit 1, the mobile unit 8 being shown in a free-standing state in FIG. 1.

The mobile unit 8 consists of a bottom part 10 having castors 11 to enable it to move towards the basic unit 1. Compression springs 12 rest on the bottom part 10, one at each of the four corners thereof. A top section 14 of the mobile unit 8 rests on the springs 12. The top section 14 contains functional components which must be capable of co-operating mechanically and/or electrically with functional components in the basic unit 1. Such co-operation may comprise the top section 14 of the mobile unit 8, which will hereinafter be referred to as the functional part which is defined as a part containing a stock of receiving material, and the basic unit 1 is a printing machine for printing images on the receiving material supplied from the functional part 14. For this purpose, the transport paths for receiving material in the functional part 14 and in the basic unit 1 must accurately mate when the basic unit 1 and mobile unit 8 are connected together, an electrical power supply also being branched off from the basic unit 1 for the mobile unit 8 when the units 1 and 8 are connected.

On the side where it is adapted to be connected to the basic unit 1, the functional part 14 carries near each bottom corner a connecting element in the form of a freely rotatable roller 15 which fits in the concave contact surface 6 of the hook 4 on the basic unit. The functional part 14 of the mobile unit 8 also carries in the middle at the top a hook 16 which fits in the recess 5 formed in the basic unit 1. Hook 16 has a contact surface 18 remote from the mobile unit 8, which contact surface, in the connected state of the units 1 and 8 is in contact with the contact surface 7 formed in the recess 5 as will be explained in detail hereinafter. Hook 16 has a contact surface 19 opposite contact surface 18 and recess 5 has a contact surface 9 opposite contact surface 7, which contact surfaces 9 and 19 come into contact with one another when a seperating force is applied to the top of functional part 14 in the connected state of the units. Contact surfaces 9 and 19 prevent the units from being pulled apart from one another at the top in the coupled condition.

Two pins 20 and 21 are fixed to the bottom part 10 of the mobile unit 8. The middle of a lever 22 is pivotally secured on pin 20 and the middle of a lever 23 is pivotally secured on pin 21. One end 25 of lever 23 carries a pin 26 fitting in the forked end 27 of lever 22 in order to couple the movement of the ends 25 and 27 when one of the levers 22 or 23 turns. The other end of lever 22 is pivotally connected by a pin 28 to the end of an L-shaped arm 30 and the other end of lever 23 is pivotally connected by a pin 29 to an L-shaped arm 31.

Each of the arms 30 and 31 projects upwards from the bottom part 10 and has a bent end 32, 33 respectively, which is situated just above stops 34 and 35 respectively on the functional part 14. Arms 30 and 31 are vertically movable in a rectilinear guide (not shown) to positions shown in FIGS. 1 and 2. The springs 12 can press the stops 34 and 35 against the ends 32 and 33, holding the functional part 14 in a lifted position with respect to the bottom part 10 in so doing, as shown in FIG. 1. In the alternative, the ends 32 and 33 pull the stops 34 and 35 down against the action of springs 12 as shown in FIG. 2. By means of a latching mechanism described hereinafter with reference to FIGS. 8–9, 12 and 13, the functional part 14 of the mobile unit 8 can be pressed down beforehand and be latched in the pressed-down position, the latching continuing until the mobile unit 8 reaches the position shown in FIG. 2. As a result, during transport and engagement, the mobile unit 8 is more stable. As will be explained hereinafter with reference to FIGS. 3 and 4, the stops 34 and 35 can also occupy a position in which they are free of the ends 32 and 33.

A pin 37 disposed a short distance above pin 21 is secured to lever 23. Together with pins 26 and 29 the pins 21 and 37 form a rectilinear guide for an operating lever 38. A collar 39 at the end of this lever 38 forms a stop which prevents the lever 38 from being pulled out between the pins 21 and 37. The operating lever 38 also rests on pin 29 and is movable between the broken-line position in which the lever 38 is received completely in the bottom part 10 and a solid-line position in which the collar 39 abuts the pins 21 and 37 and a part of the operating lever 38 which functions as a foot pedal projects from the bottom part 10.

The operation of the mechanism shown in FIGS. 1 to 4 is set forth as follows. In the free-standing position of the mobile unit shown in FIG. 1, the operating lever 38 is retracted and the mobile unit 8 is moved in this condition up to the basic unit to which it is to be connected. In the position of the operating lever 38 shown in FIG. 1, the bent-over ends 32 and 33 of arms 30 and 31 occupy the highest position and springs 12 press the functional part up against said ends 32 and 33. When the mobile unit 8 has been moved close to the basic unit 1 as shown in FIG. 2, the operating lever 38 is pulled out from beneath the bottom part 10, whereupon the projecting part of the operating lever functioning as a foot pedal is pressed down into the position shown in FIG. 2. When this foot pedal is pressed down, the operating lever 38 tilts about pin 21, and in so doing pulls down pin 29 and the arm 31 connected thereto. Pin 28 and arm 30 are also pulled down via the levers 22 and 23 coupled by pin 26. As a result of the arms 30 and 31 being pulled down, the bent-over ends 32 and 33 of these arms press the stops 34 and 35, and hence the functional part 14, down into the position shown in FIG. 2 against the action of the springs 12. In this position roller 15 is at a level completely beneath hook 4 and hook 16 is at a level at which it fits in the recess 5. The mobile unit 8 is now driven against the basic unit with the foot pedal depressed, the roller 15 being situated directly beneath hook 4 and hook 16 engages in recess 5. If the foot pedal is then released, the mobile unit 8 comes into the connected position shown in FIGS. 3 and 4. FIG. 3 illustrates the situation when the basic unit and the mobile unit 8 are both on the same flat floor. FIG. 4 illustrates the situation wherein the mobile unit 8 is at a higher level than the basic unit 1.

In each connected position, the position of the bottom part of the functional part 14 is fixed horizontally and vertically with respect to the basic unit 1, since springs 12 press the roller 15 against the concave contact surface 6 of the hook 4. The springs 12 will also press the functional part 14 with contact surface 18 of hook 16 against contact surface 7 of recess 5, so that the top part of the functional part 14 also occupies a fixed position with respect to the basic unit. When, in the connected position, both the basic unit and the mobile unit are on a flat floor, then there is a clear space between the stops 34 and 35, on the one hand, and the bent-over ends 32 and 33, on the other hand, as shown in FIG. 3. If the floor is not flat, the mobile unit at roller 15 being somewhat higher than the basic unit 1, then the distance between stop 34 and a bent-over end 32 is greater, as shown in FIG. 4. If the mobile unit 8 is at a somewhat lower level, then this distance is of course smaller.

Figure 5:
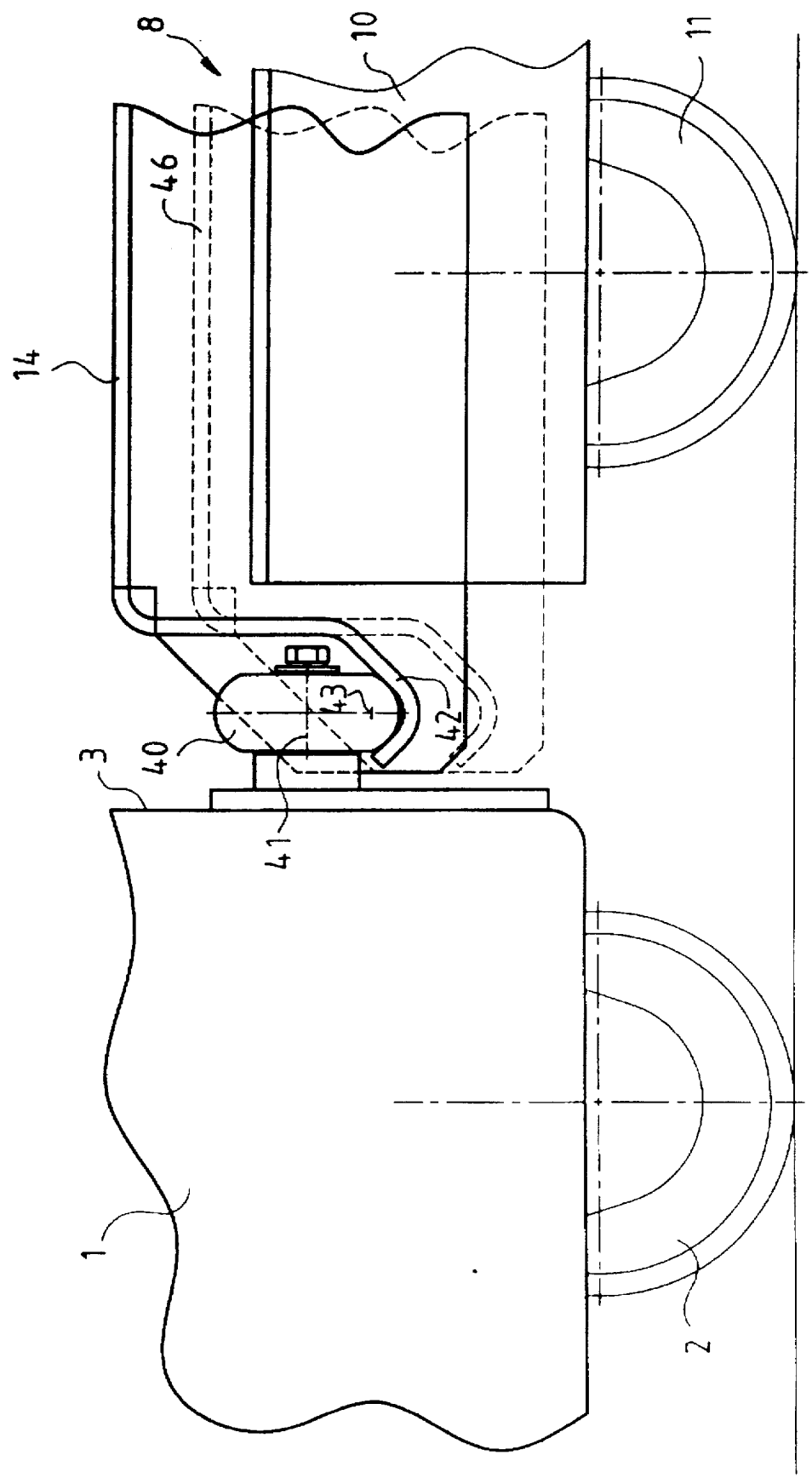
FIG. 5 is a detail of a second embodiment of the basic unit and mobile unit in the disconnected and connected state on a flat floor.
Figure 6:
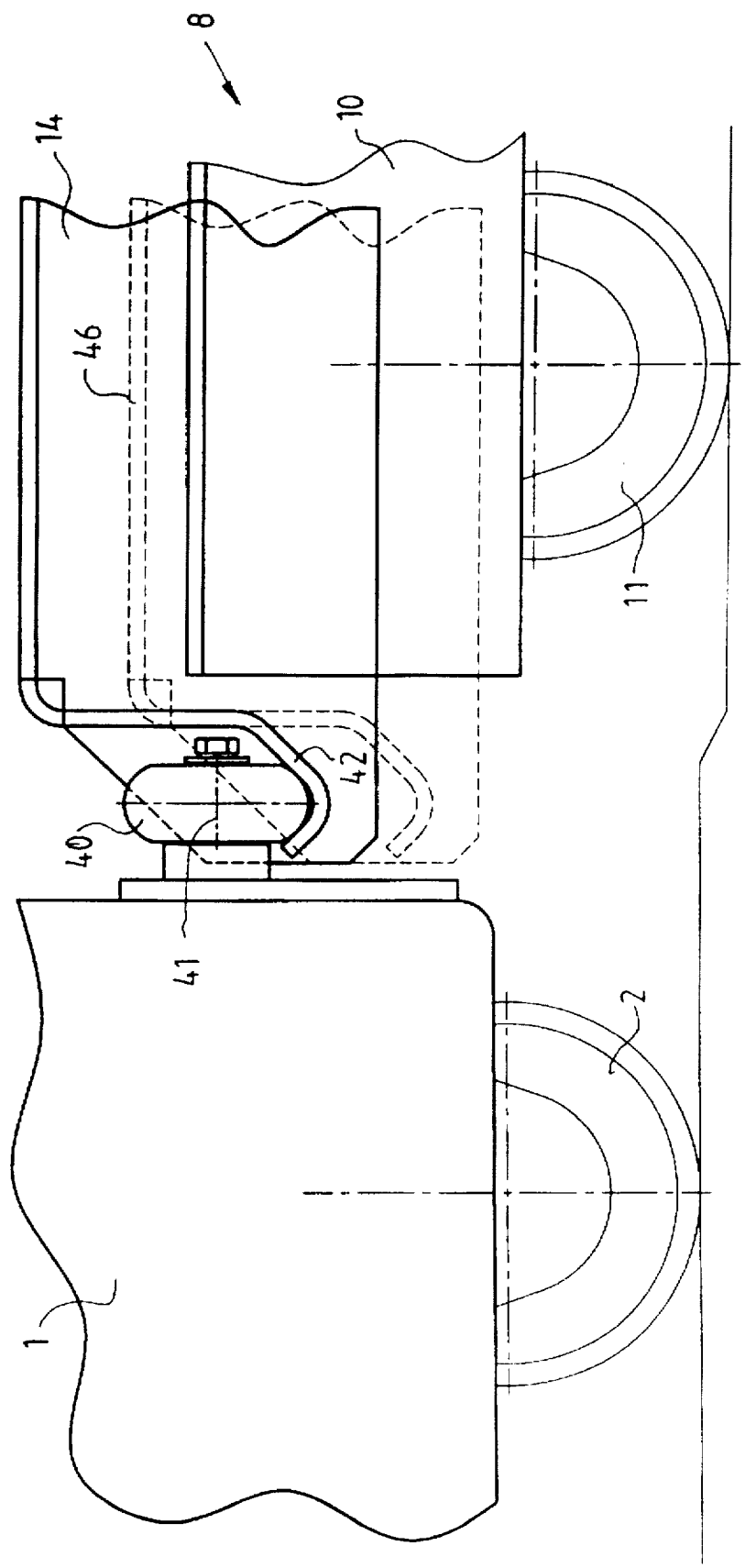
FIG. 6 is a detail of the second embodiment of the basic unit and the mobile unit in the disconnected and connected state on a floor which is not flat.
Figure 7:
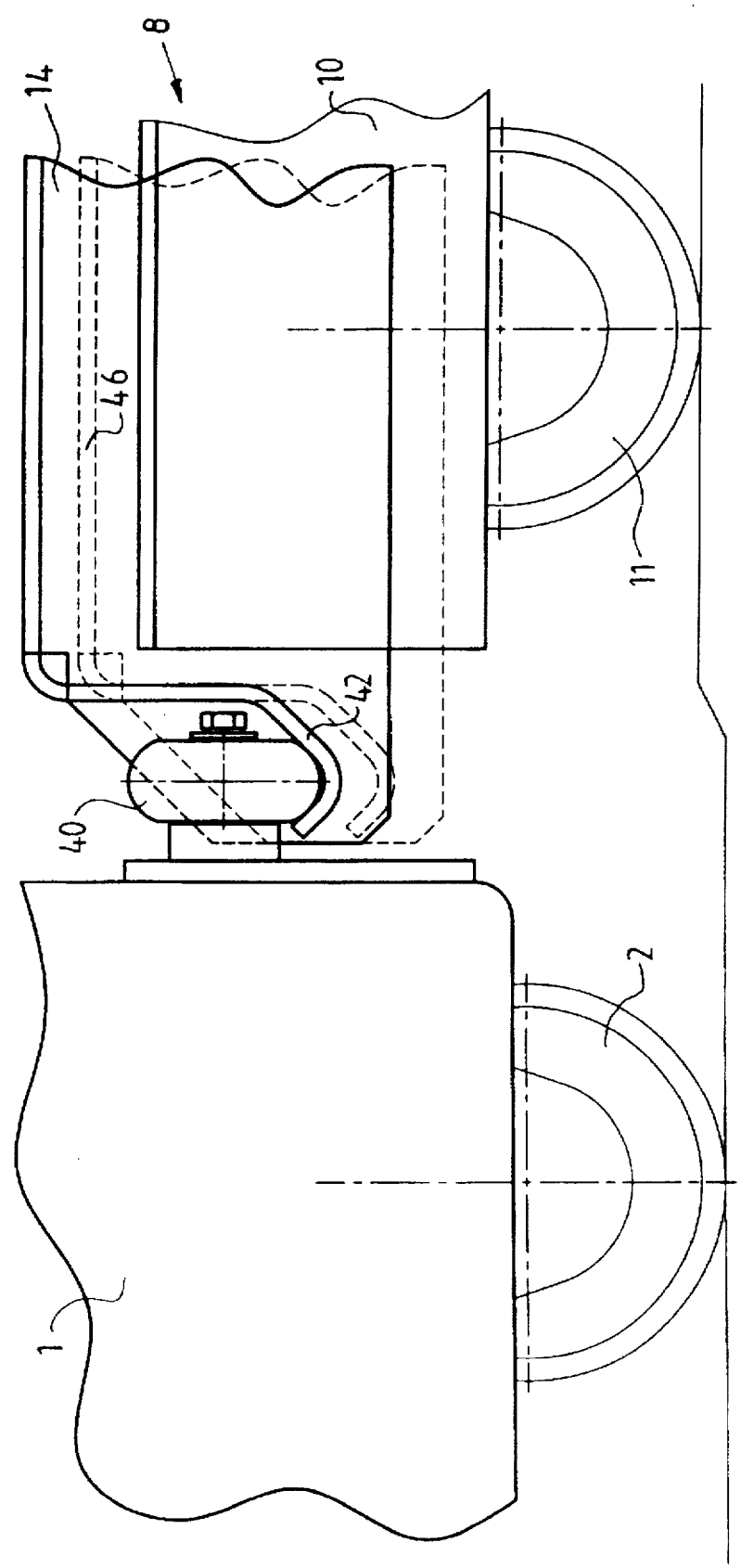
FIG. 7 is another detail of the second embodiment of the basic unit and the mobile unit in the disconnected and connected state on a floor which is not flat.

FIGS. 5 to 7 show one embodiment of a connecting mechanism according to the invention in which each connecting element on the basic unit 1 is formed by a roller 40 secured to be freely rotatable on a spindle 41 extending in the direction in which the units 1 and 8 can move towards and away from one another. A roller 40 is provided near each bottom corner at the side of the basic unit 1 to which the mobile unit 8 can be connected. When viewed perpendicular to its axial direction, roller 40 has a semi-circular peripheral surface fitting in a concave hook 42 forming the connecting element on the functional part 14 of the mobile unit 8. Since the contact surface between the roller 40 rand hook 42 occurs at a circular, or arcuate, interface, the basic unit 1 and the functional part 14 of the mobile unit 8 are each fixed with respect to one another at the centers 43 of the arcuate interface when the units are connected, but the functional part 14 of the mobile unit 8 has freedom to rotate with respect to a line through the centers 43 so that the units can also be positioned with respect to one another at the top in the same way as the connecting elements 5, 7 and 16, 18 shown in FIGS. 1 to 4.

Also, the rollers 40 shown in FIGS. 5 to 7 can roll in the channel-shaped hooks 42 in order to give the units 1 and 8 some freedom of movement in a direction perpendicular to the drawing plane, and this may be important if one of the units is skewed and/or is standing on a floor sloping somewhat in that direction. FIGS. 5, 6 and 7, respectively, illustrate a situation in which the basic unit 1 and the mobile unit 8 are both on the same flat floor (FIG. 5), a situation in which the basic unit 1 is completely or partly on a somewhat higher floor than the mobile unit 8 (FIG. 6), and a situation in which the basic unit 1 is situated completely or partly on a somewhat lower floor than the mobile unit 8 (FIG. 7).

In FIGS. 5 to 7 the hook-shaped connecting element 42 is shown in solid lines in the position connected to roller 40 while the broken lines show the position disconnected from roller 40, in which position the units 1 and 8 can be moved apart or towards one another without the hook 42 coming into contact with the roller 40. In the position shown in FIG. 7, in which the basic unit is in its lowest position, the disconnected highest position of the functional part 14 of the mobile unit 8, as shown in broken lines in FIG. 7, coincides with the transport position 46 in which the functional part 14 is kept pressed down during the movement of the mobile unit 8 towards or away from the basic unit. In FIGS. 5 and 6, this transport position 46 is lower with respect to basic unit 1 by a distance corresponding to the different elevations of the basic unit 1 and the mobile unit 8.

FIGS. 8 to 11 show an embodiment for mechanically latching the connection made between the mobile unit 8 and the basic unit 1 and for establishing an electrical connection between an electrical power supply in the basic unit 1 and components requiring an electrical power supply in the functional part 14 of the mobile unit. The above-described operating lever 38, for the purpose of mechanically connecting and disconnecting the mobile unit 8 and the basic unit 1, is used for this mechanical latching and electrical connection.

To latch the mechanical connection the operating lever 38 is movable in its longitudinal direction in the bottom part 10 of the mobile unit 8. If the operating lever 38 is pressed in the direction of arrow 50 into the bottom part 10 a screw 51 freely rotatable but axially immovable on the free end of the lever 38 operating as a foot pedal, abuts a nut 52 fixed in the bottom part 10. In this position of the operating lever 38 a projection 53 on the other end of the operating lever 38 comes against a leaf spring 54 at the end of a rod 55 axially movable in the bottom part 10. By turning screw 51 in nut 52 by hand or a hand tool when the operating lever is in this position, the operating lever moves further in the direction indicated by arrow 50 and projection 53, acting on leaf spring 54, presses rod 55 in the direction indicated by arrow 50, the rod 55 in turn turning an arm 59 pivotally secured to the bottom part 10 about pivot 58 from the position shown in FIG. 8 into the position shown in FIG. 9.

Figure 9:
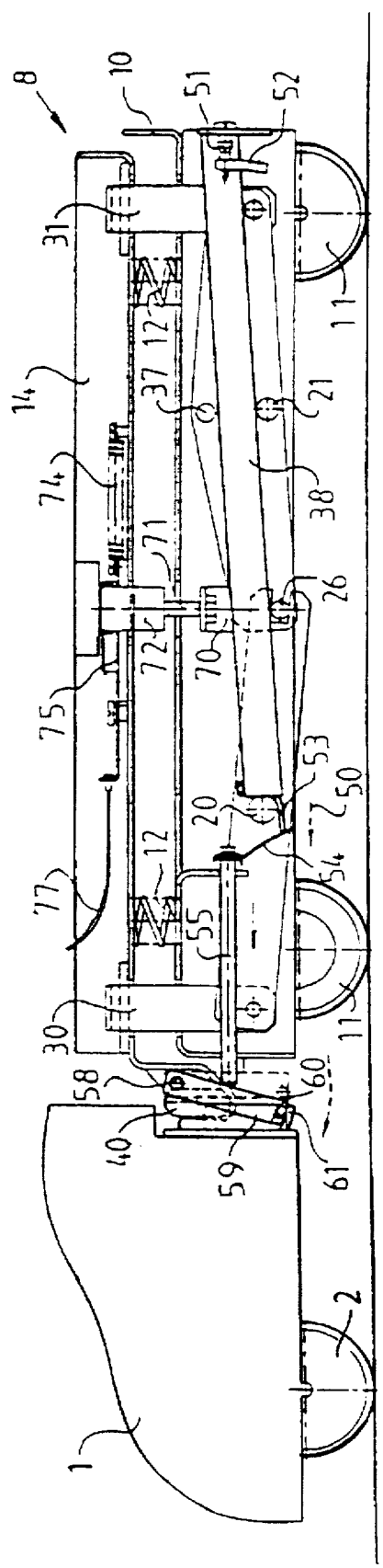
FIG. 9 shows the operating mechanism according to FIG. 8 in a position in which the electrical connection and latching have been effected.
Figure 10:
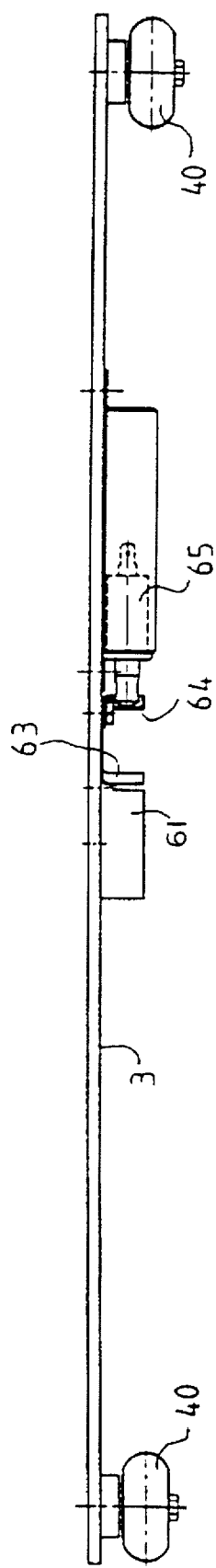
FIG. 10 is a detail of the basic unit in a top plan view with a switch establishing the electrical connection between the basic unit and the mobile unit.
Figure 11:
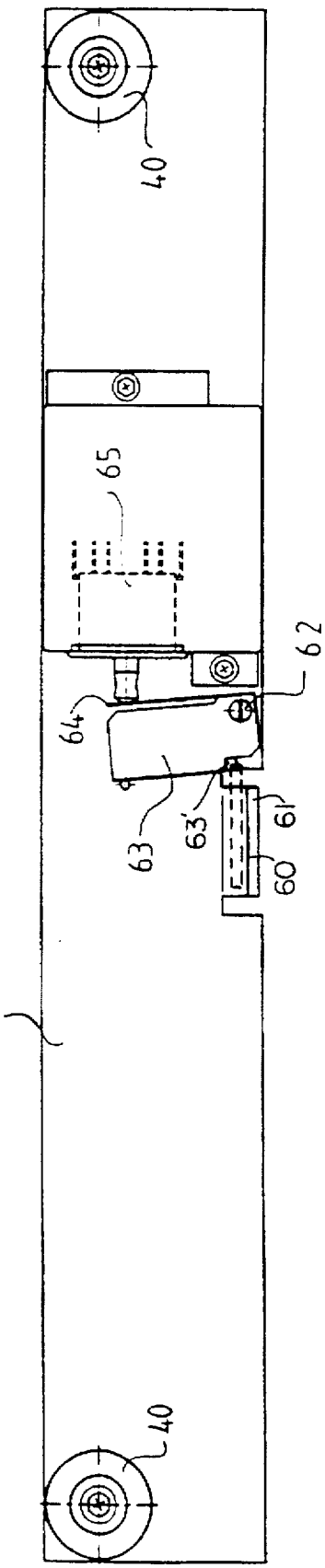
FIG. 11 is a side elevation view of FIG. 10.
Figure 12:
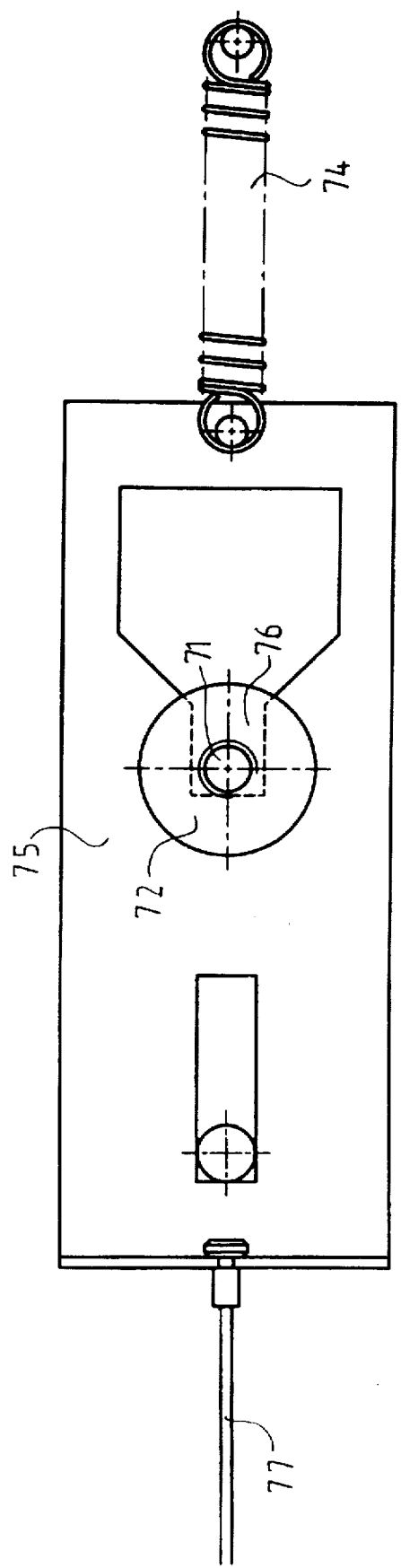
FIG. 12 is a top plan view on the line XII—XII in FIG. 8, shown in a first position.

Pin 60 fixed on arm 59 comes to lie on a projection 61 fixed on the basic unit 1, as shown in FIGS. 9 and 11. Referring to FIGS. 9 and 11, in this condition pin 60 also presses against an inclined surface 63' on element 63, which is mounted pivotally about pivot 62 on the basic unit. When said element 63 turns, a lip 64 fixed on element 63 operates an electrical switch pin 65 to establish the above-mentioned electrical connection. As a result of the co-operation of pin 60 and projection 61, the coupled mobile unit 8 cannot be readily disconnected by pressing down the functional part 14 of the mobile unit. For such disconnection the operating lever 38 must first be unscrewed from the bottom part and pulled out. Since this operation requires some time, the electrical connection has already been disconnected for some time when mechanical disconnection is effected by pressing in the foot pedal end of the operating lever 38, so that undesirable voltage build-up when the electrical connections are broken has already ceased when the mechanical disconnection is effected, and there is no burning of the contacts of the switch providing the electrical connection nor any risk of the contacts still being live if they are touched.

Figure 8:
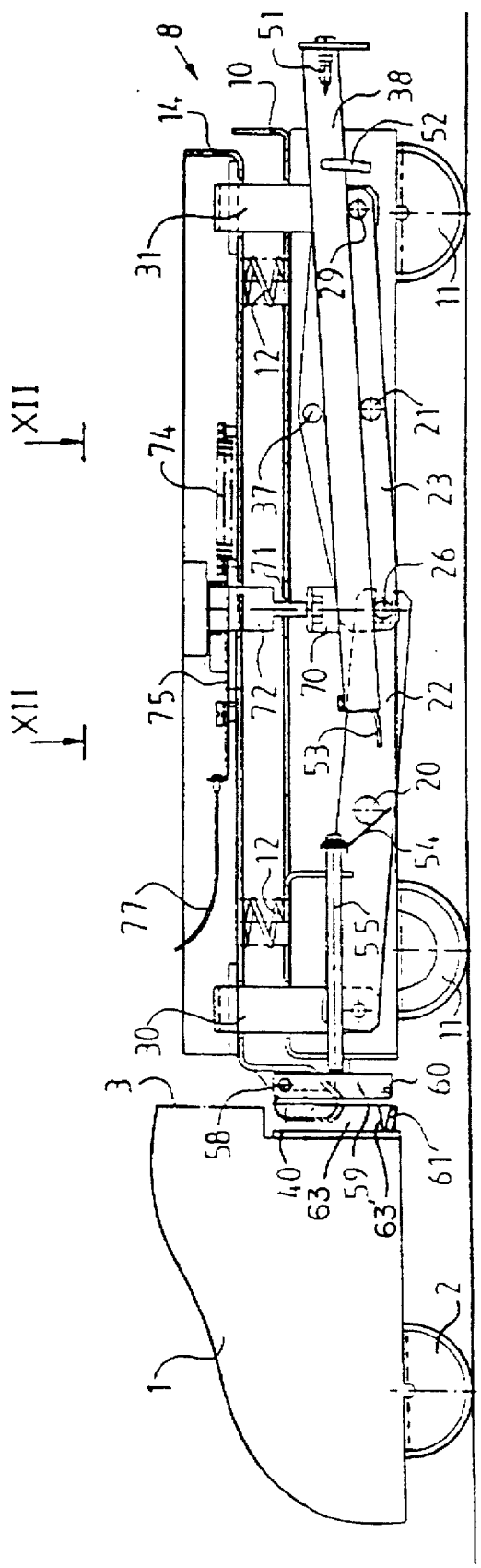
FIG. 8 shows an operating mechanism for establishing an electrical connection between the basic unit and the mobile unit and the mechanical latching of the connection between said units, in a position in which the electrical connection and latching have not yet been effected.

To latch the functional part 14 of the mobile unit 8 in its pressed-down position during transport and movement of the mobile unit 8, an arm 70 is connected to pin 26 as shown in FIGS. 8 and 9. Arm 70 is connected by a screw 71 to a block 72. When the functional part 14 is pulled down by ends 32 and 33 of arms 30 and 31, the levers 22 and 23 occupy the position shown in FIG. 2, and connecting pin 26 and the block 72 connected thereto occupy their highest position. In this highest position a slide 75, loaded by spring 74 and provided with a slot 76 in which the screw 71 but not the block 72 fits, is pulled into the position shown in FIG. 12, the block 72 coming to rest on the edges of slot 76 thus preventing the springs 12 from pressing up the functional part 14.

Figure 13:
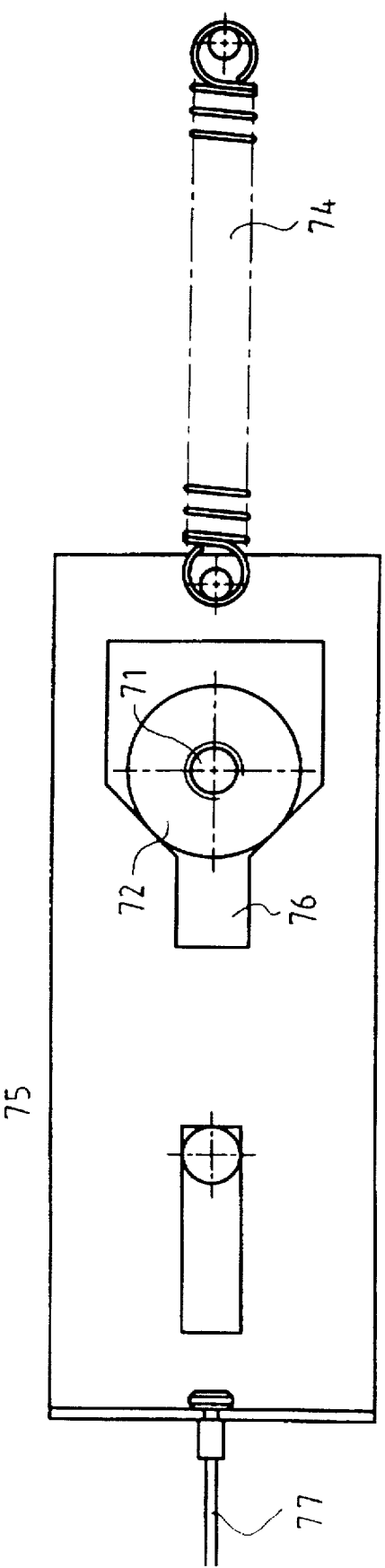
FIG. 13 is the top plan view of FIG. 12 in a second position.

When the mobile unit 8 has been moved against the basic unit 1 from the position shown in FIG. 2, the slide 75 is pulled into the position shown in FIG. 13 by means of cable 77 connected to a handle (not shown) on mobile unit 8, and in this position, the block 72 is free from slot 76 so that the springs 12 can press up the functional part 14 of mobile unit 8 in order to make the connection between units 1 and 8.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile unit including a functional part which is connectable to a basic unit provided with a first connecting element, the mobile unit comprising:

a bottom part including means for enabling movement over a support surface to thereby enable movement of the mobile unit along a first direction toward and away from the basic unit;

a functional part carried by the bottom part for movement therewith toward and away from the basic unit;

a second connecting element provided on the functional part, the second connecting part being cooperable with the first connecting element to effect a connection between the functional part and the basic unit; and means for enabling movement of the functional part relative to the bottom part between a first position in which the second connecting element is aligned with and spaced below the first connecting element and a second position in which the second connecting element contacts the first connecting element to thereby connect the functional part of the mobile unit to the basic unit.

2. The mobile unit as recited in claim 1, and further comprising means for urging the functional part upwardly relative to the bottom part to thereby press the second connecting part upwardly against the first connecting element.

3. The mobile unit as recited in claim 2, wherein the means for urging comprises a resilient element disposed between the bottom part and the functional part.

4. The mobile unit as recited in claim 1, wherein, in the second position, the second connecting element contacts the first connecting element along an arcuate contact interface.

5. The mobile unit as recited in claim 4, wherein one of the first and second connecting elements is a roller which is rotatable about an axis which extends in the first direction.

6. The mobile unit as recited in claim 2, and further comprising at least one arm with a hook-like end mounted on the bottom part for movement relative thereto between a first position in which the hook-like end engages and holds the functional part in its first position against a force applied by the urging means and a second position in which the hook-like end of the arm is disengaged from the functional part.

7. The mobile unit as recited in claim 6, and further comprising two lever members provided on the bottom part, and wherein:

- each lever member is secured between its ends to the bottom part for pivotal movement about a pivot axis which is spaced from the pivot axis of the other lever member;
- each lever member carries, at one end thereof, one of the arms; and
- the other ends of the lever members are coupled for movement together between two positions in which the coupled ends of the lever members are situated respectively on either side of a line extending through the pivot axes of the lever members.

8. The mobile unit as recited in claim 7, wherein the other ends of the lever members are coupled via a pin provided at the other end of one lever member and a fork provided at the other end of the other lever member.

9. The mobile unit as recited in claim 6, and further comprising:

- an operating lever pivotally mounted to the bottom part; and
- means for coupling the operating lever to the lever members whereby pivotal movement of the operating lever effects pivotal movement of the lever members.

10. The mobile unit as recited in claim 9, wherein the operating lever includes an actuating part thereof which is adapted to project from the bottom part.

11. The mobile unit as recited in claim 10, wherein the operating lever is also movable between an operative position in which the actuating part projects from the bottom part and an inoperative position in which the actuating part does not project from the mobile unit.

12. The mobile unit as recited in claim 11, and further comprising means for latching the first and second connecting elements against disconnection when the operating lever is in the inoperative position.

13. The mobile unit as recited in claim 11, and further comprising means for effecting an electrical connection between the basic unit and the mobile unit when the operating lever is in the inoperative position.

14. The mobile unit as recited in claim 12, and further comprising means for effecting an electrical connection between the basic unit and the mobile unit when the operating lever is in the inoperative position.

15. A mobile unit including a functional part which is connectable to a basic unit provided with first and second connecting elements, the mobile unit comprising:

- a bottom part including means for enabling movement over a support surface to thereby enable movement of the mobile unit along a first direction toward and away from the basic unit;
- a functional part carried by the bottom part for movement therewith toward and away from the basic unit;
- a third connecting element provided on the functional part, the third connecting part being cooperable with the first connecting element to effect a first connection between the functional part and the basic unit;
- a fourth connecting element provided on the functional part, the fourth connecting part being cooperable with the second connecting element to effect a second connection between the functional part and the basic unit; and
- means for enabling movement of the functional part relative to the bottom part between a first position in which the third connecting element is aligned with and spaced below the first connecting element and a second position in which the third connecting element contacts the first connecting element to thereby establish the first connection and the fourth connecting element contacts the second connecting element to thereby establish the second connection.

16. The mobile unit as recited in claim 15, wherein the fourth connecting element is located above the third connecting element.

17. The mobile unit as recited in claim 15, and further comprising means for urging the functional part upwardly relative to the bottom part to thereby press the third connecting element upwardly against the first connecting element and press the fourth connecting element against the second connecting element.

18. The mobile unit as recited in claim 17, wherein the means for urging comprises a resilient element disposed between the bottom part and the functional part.

19. The mobile unit as recited in claim 15, wherein, in the second position, the third connecting element contacts the first connecting element along an arcuate contact interface, and the fourth connecting element contacts the second connecting element along a vertical contact interface.

20. The mobile unit as recited in claim 19, wherein one of the first and third connecting elements is a roller which is rotatable about an axis which extends in the first direction.

21. The mobile unit as recited in claim 15, wherein, the fourth connecting element includes first and second opposed contact surfaces adapted for contact with the second connecting element in the second position.

22. A connecting mechanism for connecting a functional part of a mobile unit to a basic unit, the mechanism comprising:

- a first connecting element carried on one of the units and including a roller member mounted for rotation on a fixed axis on said functional part, said member having a circular peripheral contact surface;
- a second connecting element carried on the other of the units and including a concave contact surface which confronts the contact surface of the first connecting element along a generally vertical direction; and
- means for urging one of the connecting elements upwardly toward the other connecting element to thereby press the confronting surfaces of the connecting elements together and effect a connection of the functional part to the basic unit.

23. A connecting mechanism as recited in claim 22, wherein the means for urging comprises a resilient element.

24. A connecting mechanism as recited in claim 23, and further comprising means for holding the connecting elements separated from each other against a force applied by the urging means.

25. A connecting mechanism as recited in claim 22, and further comprising:

a third connecting element carried on one of the units and including a generally vertical contact surface;

a fourth connecting element carried on the other of the units and including a contact surface which confronts the contact surface of the third connecting element; and wherein the means for urging also presses the contact surfaces of the third and fourth connecting elements against each other to effect a second connection of the functional part to the basic unit.

* * * * *